United States Patent [19]

Toncelli

[11] Patent Number: 5,670,007
[45] Date of Patent: Sep. 23, 1997

[54] PROCESS FOR THE PRODUCTION OF REINFORCED SLABS OF STONE MATERIAL

[76] Inventor: Marcello Toncelli, Via Papa Giovanni XXIII, 2 - Bassano del Grappa, Italy

[21] Appl. No.: 513,687

[22] Filed: Aug. 11, 1995

[30] Foreign Application Priority Data

Aug. 25, 1994 [IT] Italy ................. TV94A0102

[51] Int. Cl.$^6$ ................. B32B 9/00; E04C 2/26; E04F 13/14
[52] U.S. Cl. ................. 156/257; 52/612; 125/1; 156/63; 156/154; 156/293
[58] Field of Search ................. 156/153, 154, 156/63, 71, 257, 293; 52/612; 125/1

[56] References Cited

U.S. PATENT DOCUMENTS

| | | | |
|---|---|---|---|
| 3,723,233 | 3/1973 | Bourke | 125/1 X |
| 4,135,019 | 1/1979 | Kourtides et al. | 156/307.3 X |
| 4,177,789 | 12/1979 | Marocco | 125/1 X |
| 4,193,829 | 3/1980 | Kourtides et al. | 156/285 X |
| 4,911,138 | 3/1990 | Leis | |
| 4,973,506 | 11/1990 | Bauer et al. | 52/612 X |
| 5,004,512 | 4/1991 | Fodera | 156/153 |
| 5,062,913 | 11/1991 | Owens et al. | 156/154 |

FOREIGN PATENT DOCUMENTS

| | | |
|---|---|---|
| 0069797 | 1/1983 | European Pat. Off. . |
| 0 252 434 | 1/1988 | European Pat. Off. . |
| 0 623 714 | 11/1994 | European Pat. Off. . |
| 0 631 015 | 12/1994 | European Pat. Off. . |
| 2 562 927 | 10/1985 | France . |
| 3940102 | 6/1990 | Germany ................. 125/1 |
| MI93A1462 | 7/1993 | Italy . |

*Primary Examiner*—Jeff H. Aftergut
*Attorney, Agent, or Firm*—McAulay Fisher Nissen Goldberg & Kiel, LLP

[57] ABSTRACT

A process for manufacturing slabs of stone material such as marble or granite, reinforced with reinforcing elements in particular made of steel and fixed to a rear surface of the slabs by a bonding resin of the hardening type. The resin is used to impregnate non-twisted strands of glass, preferably in the form of matting, in a percentage weight ratio of glass strands to resin of at least 50:50, with a preference for a quantity by weight of glass strands greater than 50%.

20 Claims, No Drawings

PROCESS FOR THE PRODUCTION OF REINFORCED SLABS OF STONE MATERIAL

BACKGROUND OF THE INVENTION

1. Field of the Invention

This invention is concerned with a process for the production of reinforced slabs of stone material.

More particularly, the present invention relates to improved materials for covering floors and lining the external and internal parts of buildings, in particular based on natural stones such as marble and granite.

2. Description of the Prior Art

The use of these natural-stone materials for the above-mentioned purposes is so well-known that no further comment is required.

However, some problems and drawbacks, mainly linked to specific applications, have been and are partly still associated with their use.

Firstly, the thickness of the slabs obtained from processing of the blocks produced by quarry-mining has hitherto been limited, in the sense that they cannot be reduced to values or thicknesses of less then 10 mm, due to the fact that slabs of a smaller thickness are unable to withstand the subsequent machining operations, such as sizing, smoothing, polishing, chamfering, etc.

Secondly, natural stones usually do not possess homogeneous physical properties, in particular as regards their impact strength and flexural strength.

Obviously these drawbacks create even more problems as regards the manufacture and use of stone products of limited thickness (namely, products in the form of slabs, tiles, etc.).

Consequently, hitherto for most applications, the products have been of a considerable thickness if not more, resulting in problems associated with their weight and hence difficulties of transportation, handling and laying.

Furthermore, in the case of large-size panels intended for the external facades of buildings, any breakage, due for example to gusts of wind, seismic tremors or even localized knocks, causes the detachment of fragments of a not insignificant size with their obvious dangers.

In recent years, much research has been carried out in connection with the manufacture of thin products made of natural stone, in particular marble or granite, which do not have the aforementioned drawbacks and problems.

In this connection, a very important part was also played by the increasingly widespread use of so-called suspended floors, namely floors supported at a certain height from the concrete layer forming the natural floor so as to form an easily accessible cavity housing all the components of internal installations for the electrical supply, telephone connections and air-conditioning. This solution has proved to be particularly advantageous for commercial buildings and offices.

Furthermore, a specific goal, with which the efforts of research technology have concentrated, but which hitherto has never been achieved, has been that of providing products made of natural stone material with a thickness comparable to that of ceramic products, so as to allow the replacement of ceramic with granite or marble even where the flooring is replaced, without the need for onerous adaptation work (such as dismantling of part of the thickness of the concrete support layer, trimming of the bottom edges of the doors, etc.).

In solutions proposed and tried hitherto, attempts have been made to reinforce thin slabs of natural-stone material by applying to their rear face (namely, the reverse face, or rear face which is the surface normally intended to remain out of view or sight) reinforcing elements, in the form of metal or glass-fibre or plastic grids, which are fixed to the aforementioned rear surface of the slab by means of a synthetic resin, for example, an epoxy or polyester resin.

In Italian Patent Application No. TV92A000041 filed on 23 Mar. 1992 and its corresponding European Patent Application No. 93201852.6, filed on Jun. 25, 1993, in the name of the same Applicant, a solution of this type is proposed, by forming in the rear or reverse face of the slab of natural-stone material, a regular grid formed by grooves or recesses having a depth less than the thickness of the starting slab and by anchoring therein a preferably metal reticular element by means of a binder, also preferably consisting of a synthetic resin, which fills the cavities and envelopes the metal elements forming the grid.

In turn, according to a subsequent patent application again filed in the name of the same Applicant and inventor (Italian Patent Application No. PD93A000099; filed on 6 May 1993, also filed as European Patent Application No. 94106949.4 filed May 4, 1994), the rear face of the slabs have recesses, and embedded in the recesses is preferably flaming the slabs or the tiles which will be formed from the latter, a reinforcing element consisting of a synthetic resin, so as to define in the edges of each slab or tile a thickness of plastic material applied so as to reinforce the tile or slab precisely in the region of the parts which are most likely to be subject to deterioration or damage during subsequent machining operations. Furthermore, these inserts of plastic material also have the property of favoring cutting of the slabs into tiles or slabs of smaller dimensions with a rational use of the available initial slab area.

Finally, in Italian patent Application No. MI93A001462 of 6 Jul. 1993 also in the name of the inventor of this application, there is described a process for manufacturing thin slabs of stone material reinforced on the rear face by means of a metal reticular element, for example a meshwork made of stretched metal or steel sheet, fixed to the aforementioned rear face by means of a bonding resin such as an epoxy resin.

Tests carried out heretofore have shown, however, that the thin slabs obtained using the aforementioned technologies, while being satisfactory from the point of view of the desired mechanical strength together with the primary objective of a limited thickness, still have a drawback arising from the difference in the thermal coefficient of expansion between the stone material and the resin used as a bonding agent.

This is obviously a drawback which was not foreseen since it was difficult to imagine that a slab of granite could become warped as a result of a difference between the thermal expansion of the granite itself and the thermal expansion of the layer of resin adhering to the rear face of the granite.

SUMMARY OF THE INVENTION

It has now been discovered, this discovery representing the main aspect of the present invention, that the aforementioned problem can be eliminated if the bonding resin is used to impregnate a plurality of glass fibres in the form of non-twisted strands with a percentage ratio of glass strands to resin of at most 50:50, and preferably with a prevalence of glass strands compared to the resin (for example 55% glass strands and 45% percent resin).

DESCRIPTION OF THE PREFERRED EMBODIMENTS

In the preferred embodiment of the present invention the glass-fibre strands are used in the form of matting.

In the applications of the present invention two main situations are contemplated, namely:

a) Production of reinforced thin slabs, with a thickness of less than 10 mm and preferably equivalent to 6–8 mm, in which the matting of non-twisted glass strands is impregnated with the bonding resin and applied to the rear face of the natural-stone slab, followed by hardening of the resin, for example by the action of a catalyst and/or heat.

When a particularly marked reinforcing effect is required, instead of a single mat of glass strands, two or more mats may be used, each impregnated with the bonding resin.

It is moreover possible and envisaged to insert between the impregnated glass-strand matting and the rear face of the slab of stone material a separate reinforcing layer, for example consisting of steel in the form of a meshwork or stretched metal sheet, operating in the manner described in the already mentioned Italian Patent Application No. MI93A001462.

In addition the bonding resin may be used to fix to the rear face of the slab of stone material a layer of fire-resistant or noise-insulating material, as envisaged in the last mentioned patent application.

b) Production of slabs of stone material for use outside of buildings, both as flooring and as wall lining materials.

In this case, the solution illustrated and described in the aforementioned Italian Patent Application No. TV92A000041 is modified in the sense that, in addition to the conventional reinforcement consisting of linear elements or of a grid made of metal, in particular steel, in the grooves formed in the rear face of the slab of stone material, use is made of non-twisted strands of glass-fibre which are impregnated with the bonding resin in the proportions indicated above, preferably so as to envelop the linear metal reinforcing elements, anchoring them inside the grooves themselves.

In this case, the resin used to envelop the linear metal reinforcing elements may contain a mineral filler with a low thermal expansion coefficient, such as silica, for example, in a quantity of up to 70% by weight with respect to the resin. Alternatively, instead of the linear metal reinforcing members seated within the grooves and forming a grid use can be made of laid down glass fiber yarns, consisting of four 4800 TEX (19.6 g/m) threads laid down within the groove having a depth of 3 to 4 mm.; the glass/resin ratio remains unchanged and the linear dilatation coefficient of this material is of 8 to $9 \times 10^{-6}$, whereby it is consistent with the stone material. Another possible alternative is represented by circular cross-section reinforcing elements (rods) of extended fiber of glass and resin (68% glass, 32% resin by weight) of a diameter of 2–2.5 mm. with a linear dilatation coefficient of $7.5 \times 10^{-6}$. These rods having a circular cross-section can be substituted or replaced by bars having a rectangular cross section.

In the preferred embodiment of the invention, in both cases the percentage of resin used with respect to the non-twisted strands of glass, both as matting and as bundles of strands, is equivalent to 33% by weight with respect to the weight of glass strands; in the case of a thin slab reinforced with two mats there will be 1600 g/m² of glass-strand component and 800 grams per square meter of resin.

Among the resins which can be used in the present invention, epoxy resins of the type bisphenol A or bisphenol A/C are preferred, while as a hardener a polyamine or a polyamide compound of the well-known type is used.

As a result of experimental tests performed in the laboratory on thin slabs of granite reinforced with two mats of non-twisted glass strands impregnated with 33% by weight of epoxy resin, it has been possible to ascertain firstly that the linear expansion coefficient of the mat+resin combination is between 15 and $30 \times 10^{-6}$ per °C., i.e. very close to that of granite.

The mechanical characteristics of the slabs thus obtained also proved to be excellent, as can be seen from the following table which shows the corresponding values for non-reinforced granite:

|  | Granite slab (thickness 8 mm) | Granite slab reinforced with 2 mats (thickness 8 mm) |
| --- | --- | --- |
| Flexural strength | 150 kg/cm² | 1950 kg/cm² |
| Impact strength (1 kg sphere) | material breaks when H = 20 cm | When H = 60–90 cm: imprint remains but material does not break When H < 60 cm: no effect, with no cracks or imprints |
| Concentrated loading test with 25 × 25 mm punch | With P = 150 kg and camber = 2.5 mm, tile breaks | With P = 600 kg and camber = 7 mm, granite disintegrates, but backing remains attached. |

In the above description, reference has been made to the impregnation of non-twisted glass strands, preferably in the form of matting, but it is obvious that this must not be regarded as limiting since other materials may be used with similar results, such as, for example, carbon fibres.

Likewise, instead of preliminary impregnation of the glass strands, it is possible to carry out a process consisting in arranging the layer or mat of glass strands and then casting the resin so as to coat and impregnate the glass strands.

For further details regarding background for the process for manufacturing reinforced slabs which are both thin and have grooves containing the metal reinforcing elements, either linear or in the form of a meshwork, reference would be made to the Italian patent applications indicated above, the contents of which are to be regarded as an integral part of the present invention.

While there has been described what is considered to be the preferred embodiments of the invention, it will be obvious to those skilled in the art that various changes and modifications may be made therein without departing from the scope of the invention.

I claim:

1. A process for producing reinforced slabs of products made of stone material, having a reinforcement which includes a hardened resin combined with a rear face of the slab, comprising providing a slab of stone material having a rear substantially smooth face free of grooves or recess;

providing non-twisted linear reinforcing elements;

coating the non-twisted linear reinforcing elements with a coating of a resin to form a reinforcement having a percentage ratio by weight of resin to the non-twisted linear reinforcing elements of at most 50:50;

inserting a reinforcing layer between the coated non-twisted linear reinforcing elements and the rear face of the slab of stone material; and hardening of the resin.

2. The process according to claim 1, wherein said non-twisted linear elements consist of strands of glass.

3. The process according to claim 2, wherein said glass strands are in the form of a matting.

4. The process according to claim 3, wherein the percentage weight ratio of the resin to the glass-strand matting is 33:66.

5. The process according to claim 1, wherein said slabs of stone material have a thickness no greater than 10 mm.

6. The process according to claim 5, wherein said slabs of stone material have a thickness between 6 to 8 mm.

7. The process according to claim 1, wherein the linear reinforcing elements are made of metal, and the metal is steel.

8. The process according to claim 1, wherein grooves or recesses are formed on said rear face of the slab and said linear reinforcing elements are housed in the grooves or recesses.

9. The process according to claim 8, wherein said grooves or recesses form a grid.

10. The process according to claim 8 including inserting laid down glass fiber yarns between said reinforcement and the rear face of the slab linear reinforcing elements and sealing the laid down glass fiber yarns within the grooves or recesses.

11. The process according to claim 10, wherein said linear reinforcing elements include rods or bars of extruded fibers of glass and resin.

12. The process according to claim 11, wherein said linear rods or bars have a diameter of 2 to 2.5 mm.

13. The process according to claim 11, wherein said rods or bars comprise 68% glass and 32% resin, the percentages being expressed by weight.

14. The process according to claim 1, wherein the linear reinforcing elements include the glass strands and resin having a ratio of 55:45 of the glass strands to the resin.

15. The process according to claim 1, wherein said slabs of stone material have a thickness between 6 to 8 mm.

16. The process according to claim 15, wherein hardening of the resin is performed by the step selected from the group consisting of adding a catalyst to the resin, application of heat to the resin, or combination of the addition of a catalyst and heat.

17. The process according to claim 1, wherein the linear reinforcing members comprise four 4800 TEX (19.6 g/m) glass threads laid down within grooves formed in the slabs having a dimension of 3 to 4 mm in depth.

18. The process according to claim 17, wherein the glass threads are non-twisted and have a linear dilatation coefficient of 8 to $9 \times 10^{-6}$.

19. The process according to claim 17, wherein the glass threads are cylindrical and have a circular cross-section with a diameter between 2 to 2.5 mm, a linear dilatation coefficient of $7.5 \times 10^{-6}$ and a glass content of 68 percent and resin content of 32 percent by weight.

20. The process according to claim 1, including applying two mats of non-twisted glass strands impregnated with 33% by weight of an epoxy resin, to provide for a linear expansion coefficient of the mat and resin combination between 15 and $30 \times 10^{-6}$ per °C.

* * * * *